Figures 1, 2:
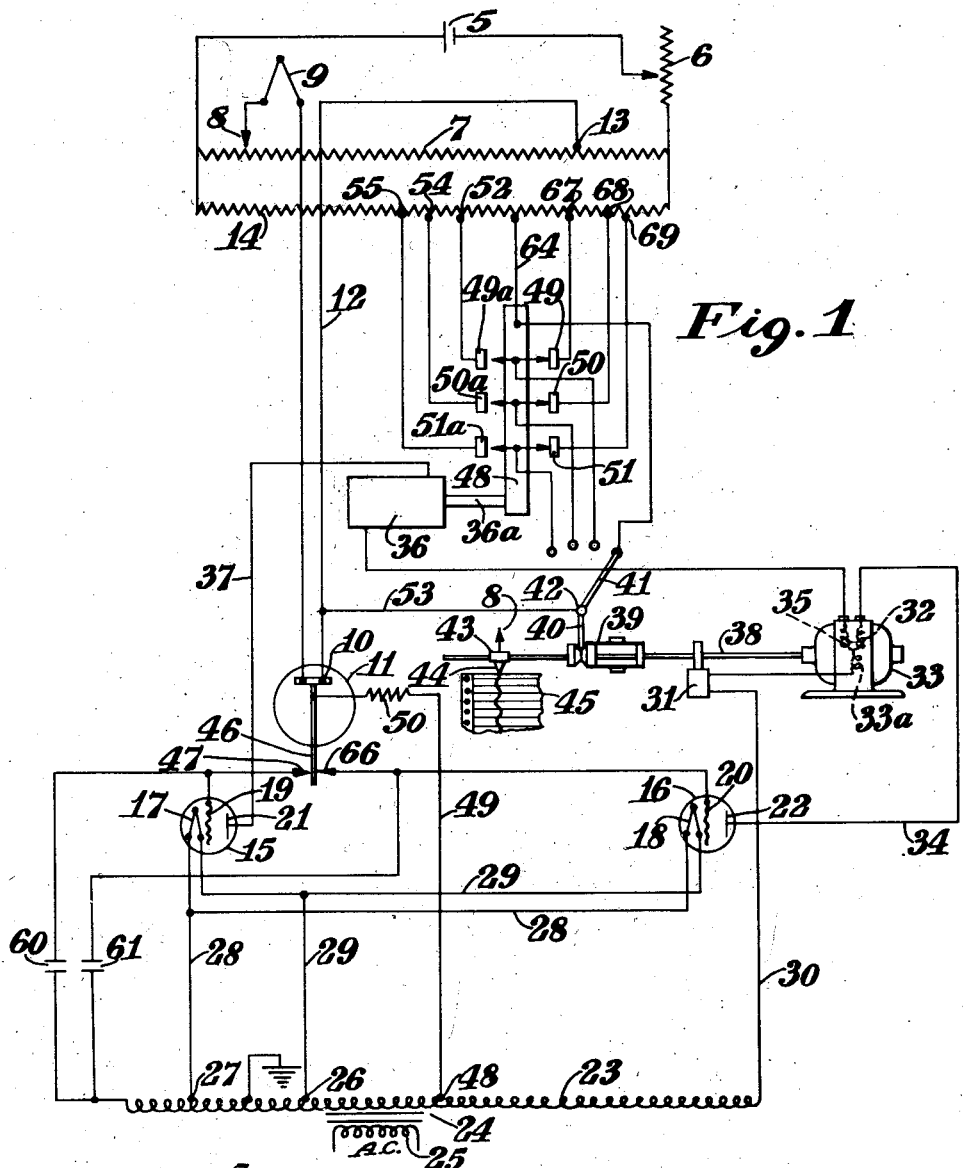

INVENTOR
William M. Young
BY D. Clyde Jones
ATTORNEY

Patented May 3, 1938

2,115,834

UNITED STATES PATENT OFFICE 2,115,834

MOTOR CONTROL SYSTEM

William M. Young, Rochester, N. Y., assignor to Taylor Instrument Companies, Rochester, N. Y. a corporation of New York Application December 1, 1932, Serial No. 645,184

20 Claims. (Cl. 172—239)

This invention relates to control systems and more particularly to systems of motor control.

In various automatic control systems wherein a motor is operated at relatively high speeds to advance an element to a predetermined point, it is essential that the motor start to decelerate before the predetermined point is reached since otherwise the kinetic energy of the motor and its related parts would cause the element to "overthrow" or pass by the predetermined point with the resultant hunting of the motor in an effort to adjust the element to the predetermined position. Such a requirement must be satisfied in an automatic potentiometer system wherein the electric balance thereof, disturbed by a change in potential across a portion of the system, sets in operation a motor driven member effective to restore the balanced condition of the system.

The main feature of the present invention, therefore, relates to an arrangement in a system of motor control whereby switching means adjusted in accordance with the speed of the motor selectively changes the effectiveness of anticipating means included in the system whereby the deceleration of the motor is initiated when a predetermined stopping point is approached.

Other features of the invention will appear from the detailed description and claims when taken with the drawing in which Fig. 1 diagrammatically represents the invention applied to a recording pyrometer of the automatic potentiometer type; and Fig. 2 is a schematic showing of the potentiometer and anticipating networks employed in the system of Fig. 1.

In the system disclosed in Fig. 1, there is illustrated a potentiometer network which includes the battery 5, an adjustable rheostat 6 and a slide wire resistor 7, connected in series. The contactor 8 adjustably engages the slide wire resistor and connects thermocouple 9, as well as the moving coil 10 of the galvanometer 11, through conductor 12 to a fixed tap 13 on the mentioned resistor. There is also connected in parallel to the slide wire resistor 7, a tapped resistor 14 forming part of an anticipating control network, the purpose of which will be hereinafter set forth.

The system also includes an amplifier comprising two electrostatically controlled arc discharge relays 15 and 16 and their related circuits. The relay 15 has a cathode 17, a control grid 19 and an anode 21 enclosed in a sealed envelope filled with an ionizable gas such as mercury or argon, and the relay 16, which is similarly constructed, has a cathode 18, a control grid 20 and an anode 22. The various electrodes of these relays are energized from the secondary winding 23 of the transformer 24, the primary winding 25 of which is connected to a commercial source of alternating current such as 60 cycle 110 volt A. C. The secondary transformer winding 23 has the taps 26 and 27 so that alternating current of the proper voltage for heating cathodes 17 and 18 may be applied over conductors 28 and 29 to these cathodes in parallel. Potential is similarly applied to the anode of relay 15 from winding 23 over conductor 30, winding of the solenoid brake 31, armature 33a and field winding 35 of the motor, winding of the relay 36, conductor 37, to the anode 21, while potential for the anode of relay 16 is supplied from the right end of the winding 23, conductor 30, winding of the solenoid brake 31, armature 33a and field coil 32 of the universal motor 33, conductor 34 to the anode 22. An alternating potential is normally applied from the left end of transformer winding 23 through capacitor 60 to the control grid 19 of relay 15 and a similar alternating potential is likewise applied from the left end of winding 23 through capacitor 61 to the control grid 20 of relay 16. By this arrangement the control grids 19 and 20 are of opposite polarity in relation to their respective anodes 21 and 22 so that these relays normally develop no arc between their electrodes and therefore permit no current to pass.

The shaft 38 of the motor 33 carries a fly-ball governor mechanism 39 which engages arm 40 of the switch brush 41 pivoted at 42. This brush under the control of the fly-ball governor moves counter-clockwise and successively engages several switch contacts to complete the various break-points in the anticipating circuit network including resistor 14. The motor shaft 38 is screw-threaded at its left hand end to drive a screw-threaded carriage 43, which carriage moves the adjustable contact 8 along the slide wire resistor 7 of the potentiometer and also moves the stylus 44 transversely of the chart 45. This chart, which has suitable coordinates of temperature and time, is advanced in accordance with time by suitable clock mechanism (not shown).

In the operation of the system let it be assumed that the temperature to which the thermocouple is exposed changes, so that the electromotive force developed across the terminals of the thermocouple 9, decreases, whereby the balance of the normally balanced potentiometer network is disturbed and a new point of balance is indicated therein. In response to this lack of balance in the potentiometer network, the galvanometer 11 swings its needle 46 to engage its left hand contact 47. The closure of this contact connects the tap 48 on the secondary winding 23 of the transformer, which tap is more positive than either tap 26 or 27 connected to the filament system, through conductor 49, resistor 50, galvanometer needle 46, contact 47, to the control grid 19 of the relay 15. Under the control of this circuit the control grid 19 becomes positive simultaneously with the anode 21 once during each cycle of the alternating current from the commercial source, and each time that this condition exists an arc is developed from the cathode 17 to the anode 21 so that the motor 23 is energized by current flowing in a circuit traceable from the tap 27 of the transformer winding 23, cathode 17, anode 21, conductor 37, winding of the relay 36, field winding 35 and armature 33a of the motor 33, through the solenoid brake 31, conductor 30 and thence through the right hand portion of the secondary winding 23, to tap 27. The solenoid brake is thus energized to release the shaft 38 and the motor 33 is energized in the above circuit to rotate its shaft 38. The motor shaft through its threaded connection with the carriage 43 moves the contact 8 to establish the balance of the potentiometer network, and also moves the stylus 44 to describe a time-temperature curve on the chart 45.

The relay 36 in the motor circuit just described on energization, attracts its core 36a and the arm 48 carried thereby, to close the normally open contacts 49a, 50a and 51a. As the motor 33 accelerates, the fly-ball governor 39 moves the switch brush 41 depending on the speed of the motor, about its pivot 42 successively into engagement with the three contacts positioned in the arc of a circle at the left of its normal contact. With the solenoid 36 thus energized to close its three contacts 49a, 50a and 51a, when the switch wiper 41 is moved to the left to its first position, tap 13 on the slide wire resistor and tap 52 on the resistor 14 in parallel therewith have the same potential value. This will be appreciated when it is noted the tap 13 is connected through conductors 12 and 53, switch brush 41 in its first position, and contacts 49a (now closed) connected to tap 52. In like manner when the speed of the motor increases so that the switch brush 41 is moved into its second position, the tap 54 is established at the same potential as the tap 13 through a circuit similar to that previously described, except that in the present instance the circuit extends through the contacts 50a. Also when the speed of the motor 33 increases until the switch brush 41 is in its third position, tap 55 is established at the same potential as the tap 13 over a circuit similar to that described, except that now the circuit extends through contacts 51a. Thus, in accordance with the speed of the motor 33, the switch brush 41 serves, in effect, to make the resistor 14 of the variable type.

It will be appreciated that, if the galvanometer needle remained in engagement with one of its contacts such as 47 until the potentiometer network was again balanced, the operating circuit of the relay 21 would be maintained closed and the motor 33 would advance contact 8 until it reached the new balanced point indicated by thermocouple 9. However, the kinetic energy of the motor 33 and its connected parts would then cause the contact 8 to over-run or pass by the point of balance set up by the thermocouple 9 and, as a result of this over-run, "hunting" or an oscillating movement of the contact 8 about the indicated point of balance would take place. In order to avoid such a condition an anticipating network in accordance with the present invention is provided. This network includes the resistor 14, together with various connections therefrom through the contacts of the relay 36, conductors 53 and 12, to tap 13 on the slide wire resistor 7.

It is believed that the operation of the anticipating network will best be understood from the diagram shown in Fig. 2, in which it is assumed that the new point of balance established by the change in potential across the terminals of the thermocouple 9, is at point 63 on section 7a of the slide wire resistor. The switch brush 41 together with the conductors 12 and 53, as well as tap 64, normally serve to connect together the terminals of section 7b of the slide wire resistor and section 14b of the resistor in the anticipating network. However, as the motor 33 accelerates, the switch brush 41 successively engages its terminals now connected by the relay 36 (now operated) to taps 52, 54 and 55. Thus the electromotive forces across the terminals of resistor sections 7b and 14b increase so that the difference in potential between the point 13 and the point 65 where the contact 8 is in engagement with the slide wire resistor 7a, is effectively reduced with the result that there will be a pseudo-balance established at a point such as 76 before the true balance point 63 is reached by contact 8. When, however, this contact reaches this pseudo-balance point, the needle 46 of the galvanometer is swung to its intermediate position and the circuit through contact 47 is broken with the result that the motor 33 has its operating circuit opened. However, the kinetic energy of the motor is usually sufficient to carry the contact 8 to the true balance point 63. In the event that the kinetic energy of the motor does not effect this result, the galvanometer will again swing its needle 46 into engagement with contact 47 because of the lack of a true balance and the circuit of the motor 33 through relay 15 will be completed for a very short period, while the motor advances the contact 8 further toward the true balance point. It will be appreciated that if the motor 33 is operated slowly, switch brush 41 will close the circuit through the anticipating network to tap 52 with the result that the pseudo-balance point is relatively close to the true balance point 63, whereas when the speed of the motor increases and the brush 41 successively engages the contacts more remote from its normal position, the pseudo-balance point 76 will recede from the true balance point 63, so that the increased kinetic energy of the motor and its related parts is compensated for.

If it be assumed that the temperature to which the thermocouple is exposed, changes so that the electromotive force developed across the terminals of the thermocouple 9 increases to unbalance the potentiometer network again, then the galvanometer needle 46 swings into engagement with the right hand contact 66. Under this condition the relay 16 now closes an operating circuit for the motor 33 which rotates in the reverse direction from that previously described; to move the contact 8 and the stylus 44 in their reverse direction. It will be noted that in this instance the operating circuit of the motor 33 does not include the winding of the relay 36 and consequently the normal contacts of the relay remain closed as shown. In this instance taps 67, 68 and 69 of the resistor 14 are effective. It should be understood that the relay 36 is necessary since the fly-ball governor control switch functions in the same manner both on the forward and reverse operations of the motor, so that the relay 36 is provided to distinguish between this forward and reverse movement whereby the pseudo-balance point is always nearer contact 8 than the true balance point, as indicated by thermocouple 9.

I claim:

1. In a system of the class described, a normally balanced network, means for disturbing the balance of said network, a member movable to restore the balance of said network at a new balance point, operating means including a reversible motor for moving said member in response to the lack of an approximate balance of said network, anticipating means connected electrically to said network effective during the forward and reverse operation of said motor, said anticipating means including progressively movable switching means actuated in accordance with the speed of said motor, and electromagnetic means serving to determine at which side of said balance point said anticipating means is effective.

2. In a system of the class described, a normally balanced network, means for disturbing the balance of said network, a member movable to restore the balance of said network at a new balance point, operating means including a reversible motor for operating said member in response to the lack of an approximate balance of said network, anticipating means effective during the forward and reverse operation of said motor, said anticipating means including a progressively movable switching means actuated in accordance with the speed of said motor, and a relay in series with field winding of said motor and energized therewith to determine at which side of said balance point said anticipating means is effective.

3. In a system of the class described, an automatic potentiometer network including a resistor in series with a source of potential, a thermocouple and a galvanometer adjustably connected across a portion of said resistor by means including a contactor, means including a motor responsive to a lack of balance in said potentiometer network for causing relative movement between said resistor and said contactor to restore the balance of said potentiometer network, an anticipating network including a second resistor connected in parallel with said first resistor, and means including a progressively movable switch adjusted in accordance with the speed of said motor for selectively connecting points on said second resistor in multiple with a point on said first mentioned resistor.

4. In a system of the class described, an automatic potentiometer network including a resistor in series with a source of potential, a thermocouple and a galvanometer adjustably connected across a portion of said resistor by means including a contactor, means including a motor responsive to a lack of balance in said potentiometer network for causing a relative movement between said resistor and said contactor to restore the balance of said potentiometer network, an anticipating network including a second resistor connected in parallel with said first resistor, sets of taps for selectively connecting portions of said second resistor to a point on said first resistor, and means effective in accordance with the direction of operation of said motor for rendering one or the other of the sets of taps effective.

5. In a system of the class described, an automatic potentiometer network including a resistor in series with a source of potential, a thermocouple and a galvanometer adjustably connected across a portion of said resistor by means including a contactor, means including a motor responsive to a lack of balance in said potentiometer network for causing relative movement between said resistor and said contactor to restore the balance of said potentiometer network, said motor having two field windings, an anticipating network including a second resistor connected in parallel with said first resistor, sets of taps on said second resistor, means effective in accordance with the speed of said motor for connecting portions of said second resistor to a point on said first resistor through one or the other of said sets of taps, a relay having front and back contacts to render effective one or another of said sets of taps, and a circuit for said relay in series with a field winding of said motor.

6. In a system of the class described, an automatic potentiometer network including a resistor in series with a source of potential, detecting means and an electromagnetic device adjustably connected across a portion of said resistor, means including a motor responsive to a lack of balance in said potentiometer network for altering said adjustable connection to restore the balance of said potentiometer network, an anticipating network including a second resistor connected in parallel with said first resistor, and means including progressively movable switching mechanism adjustable in accordance with the speed of said motor for selectively connecting one of several points in said second resistor in multiple with a point on said first-mentioned resistor.

7. The method of restoring the balance of a normally balanced electrical system including a primary network and a related branch conduit which comprises adjusting said primary network in response to a lack of balance thereof and in such a manner as to decrease the lack of balance until the balanced condition is reestablished, while simultaneously further decreasing the unbalance of the primary network by increasing the current flow through a portion of said branch conduit as a result of altering an effective electrical characteristic of the branch circuit according to the rate of said adjustment.

8. In a system of the class described, a normally balanced network, means for disturbing the balance of said network, a member movable to restore the balance of said network at a new balance point, operating means including a motor for moving said member in response to the lack of an approximate balance of said network, speed responsive means operated by said motor, switching means actuated by said speed responsive means, and an anticipating branch circuit associated with said network and selectively controlled by said switching means for increasing the current in a portion of said branch circuit to establish one of several balance points with reference to said new balance point whereby said motor starts to decelerate before said new balance point is reached.

9. The method of restoring the balance of a normally balanced electrical system including a primary network and a branch circuit in parallel therewith which comprises detecting the lack of balance of said primary network, adjusting said primary network in response to a detected lack of balance thereof and in such a manner as to decrease the detected lack of balance until a balanced condition is reestablished, while simultaneously further decreasing the detected lack of balance of the primary network by altering an effective electrical characteristic of the branch circuit according to the rate of said adjustment.

10. In a system of the class described, a normally balanced electrical network, means responsive to a changed condition for unbalancing said network, a member movable to restore the electrical balance of said network, a progressively adjustable anticipating network connected in parallel with at least a portion of said first network, and means responsive to the rate of movement of said member for selectively adjusting said anticipating network to reduce the lack of balance in said first network.

11. In a system of the class described, a normally balanced electrical network, means responsive to a changed condition to unbalance said network, a member movable to restore the electrical balance of said network, a motor responsive to said unbalance for moving said member, an adjustable electrical anticipating network connected in parallel with at least a portion of said first network, and progressively adjustable switching means controlled by the speed of said motor for selectively adjusting said anticipating network to reduce the lack of balance in said first network.

12. In a system of the class described, a normally balanced system including a primary network, means for disturbing the balance of said primary network, a member movable to balance said network at a new balance point, operating means including a motor for moving said member in response to the lack of an approximate balance of said network, and an anticipating secondary network connected in parallel with at least a portion of said primary network and including switch mechanism controlled by the speed of said motor for changing the voltage in said primary network to establish one of several approximate balance points with reference to said new balance point whereby said motor starts to decelerate before said new balance point is reached.

13. In a system of the class described, a normally balanced network, means for disturbing the balance of said network, a member movable to restore the balance of said network at a new balance point, operating means including a motor for moving said member in response to the lack of an approximate balance of said network, and anticipating means connected in parallel with at least a portion of said primary network and including progressively movable switching mechanism actuated in accordance with the speed of the motor for establishing in said network one of several approximate balance points with reference to said new balance point whereby said motor starts to decelerate before said new balance point is reached.

14. In a system of the class described, a normally balanced network, means for disturbing the balance of said network, a member movable to restore the balance of said network at a new balance point, operating means including a motor for moving said member in response to the lack of an approximate balance of said network, a fly-ball governor actuated by said motor, switching means operated by said fly-ball governor, and an anticipating network in parallel with at least a portion of said first network and partly short circuited by said switching means for establishing in said first network one of several balance points with reference to said new balance point whereby said motor starts to decelerate before said new balance point is reached.

15. In a system of the class described, a normally balanced primary network, means for disturbing the balance of said network, a member movable to restore the balance of said network at a new balance point, operating means for moving said member in response to the lack of an approximate balance in said network, a secondary network in parallel with at least a portion of said primary network, means including speed responsive mechanism actuated in accordance with the speed of said member serving to alter the balanced condition in said primary network, and means including said secondary network to indicate a transient balance condition in said primary network as long as said member is in motion.

16. An electrical network unbalanced upon change in magnitude of a measured condition, a member deflecting from neutral position in response to application of a torque produced by unbalance of the network, an impedance adjustable to rebalance said network, a driving system responsive to deflection of said member from neutral position, and means including means operated by said driving system for introducing into said network a voltage varying as the second power of the speed of said driving system.

17. A system comprising means for producing a standard electrical effect, means for producing an electrical effect of magnitude determined by the magnitude of a condition under measurement, a network in which said effects are brought into opposition, a detector energized by unbalance of said network, an impedance in said network adjustable to rebalance it, a driving system controlled by said detector for effecting adjustment of said impedance, and means for introducing into said network an electrical effect varying as a power higher than the first power of the speed of said driving system.

18. The method of restoring the balance of an electrical system including a normally balanced primary network and a related branch circuit said primary network being unbalanced by a change of an electromotive force therein which method comprises adjusting said primary network in response to the lack of balance thereof and in such a manner as to decrease said electromotive force until a balanced condition is reestablished, while simultaneously further decreasing said electromotive force by reducing the impedance of said branch circuit as a result of mechanically altering an effective electrical characteristic thereof at a rate corresponding to the rate of said adjustment.

19. An electrical network unbalanced upon change in magnitude of a measured condition, a member deflecting from neutral position in response to application of a torque produced by unbalance of the network, an impedance adjustable to rebalance said network, a driving system responsive to deflection of said member from neutral position, and means including means operated by said driving system for introducing into said network an electrical effect varying as the second power of the speed of said driving system.

20. An electrical network unbalanced upon change in magnitude of a measured condition, a member deflecting from neutral position in response to application of a torque produced by unbalance of the network, an impedance adjustable to rebalance said network, a driving system responsive to deflection of said member from neutral position, and means including means operated by said driving system for introducing into said network an electrical effect, varying as a power higher than the first power of the speed of said driving system.

WILLIAM M. YOUNG.